(12) United States Patent
Kinoshita et al.

(10) Patent No.: US 11,059,112 B2
(45) Date of Patent: Jul. 13, 2021

(54) MILLING TOOL

(71) Applicant: SUMITOMO ELECTRIC HARDMETAL CORP., Itami (JP)

(72) Inventors: Keiji Kinoshita, Itami (JP); Kouki Matsubara, Itami (JP)

(73) Assignee: Sumitomo Electric Hardmetal Corp., Itami (JP)

( * ) Notice: Subject to any disclaimer, the term of this patent is extended or adjusted under 35 U.S.C. 154(b) by 145 days.

(21) Appl. No.: 16/309,147

(22) PCT Filed: Jan. 16, 2018

(86) PCT No.: PCT/JP2018/001057
§ 371 (c)(1),
(2) Date: Dec. 12, 2018

(87) PCT Pub. No.: WO2018/173437
PCT Pub. Date: Sep. 27, 2018

(65) Prior Publication Data
US 2019/0126366 A1    May 2, 2019

(30) Foreign Application Priority Data

Mar. 24, 2017   (JP) .............................. JP2017-059267

(51) Int. Cl.
*B23C 5/22*    (2006.01)
(52) U.S. Cl.
CPC ...... *B23C 5/2208* (2013.01); *B23C 2210/165* (2013.01); *B23C 2226/125* (2013.01); *B23C 2226/315* (2013.01)

(58) Field of Classification Search
CPC ... B23C 5/28; B23C 5/2208; B23C 2210/165; B23C 2210/168; B23C 2226/125; B23C 2226/315
See application file for complete search history.

(56) References Cited

U.S. PATENT DOCUMENTS 3,708,843 A * 1/1973 Erkfritz ................. B23C 5/2208
                                                                   407/38
4,946,321 A    8/1990 Allemann
(Continued)

FOREIGN PATENT DOCUMENTS

CA           2765510 A1 *  9/2012  ......... C04B 41/5031
CN         103785866 A     5/2014
(Continued)

*Primary Examiner* — Alan Snyder
(74) *Attorney, Agent, or Firm* — Baker Botts L.L.P.; Michael A. Sartori

(57) ABSTRACT

A milling tool includes: a body having an outer circumferential surface formed around a central axis; a cutting insert having a rake surface, a flank surface, and a cutting edge formed by a ridgeline of the rake surface and the flank surface; and a screw attaching the cutting insert to the body. The outer circumferential surface has an insert attachment portion. The insert attachment portion is defined by a first seat surface continuing to the outer circumferential surface and a second seat surface continuing to the first seat surface and having a flat portion provided with a screw hole in which the screw is inserted. The cutting edge is formed of a sintered material containing at least one of cubic boron nitride and polycrystalline diamond. In a cross section perpendicular to the central axis, a first angle formed by a first direction and a second direction is an acute angle.

7 Claims, 4 Drawing Sheets

(56) References Cited

U.S. PATENT DOCUMENTS

| | | | |
|---|---|---|---|
| 5,667,343 A * | 9/1997 | Hessman | ................ B23C 5/241 407/36 |
| 6,722,823 B1 * | 4/2004 | de Souza | ................ B23C 5/006 407/113 |
| 2007/0127992 A1 | 6/2007 | Spichtinger et al. | |
| 2007/0180963 A1 | 8/2007 | Basch | |
| 2008/0226402 A1 | 9/2008 | Kammermeier et al. | |
| 2013/0051934 A1 | 2/2013 | Henry et al. | |
| 2014/0003872 A1 | 1/2014 | Kovac et al. | |
| 2018/0297123 A1 * | 10/2018 | Harif | .................... B23C 5/2208 |

FOREIGN PATENT DOCUMENTS

| | | | | |
|---|---|---|---|---|
| CN | 105583451 A | 5/2016 | | |
| DE | 102014111637 A1 | 3/2015 | | |
| EP | 3150319 A1 * | 4/2017 | ............. | B23C 5/006 |
| JP | H07-195220 A | 8/1995 | | |
| JP | H08-507725 A | 8/1996 | | |
| JP | 2007-525334 A | 9/2007 | | |
| JP | 2008-188751 A | 8/2008 | | |
| JP | 2010-535638 A | 11/2010 | | |
| JP | 2013-202767 A | 10/2013 | | |
| JP | 2014-030888 A | 2/2014 | | |
| JP | 2016-159388 A | 9/2016 | | |
| WO | 1994/021411 A1 | 9/1994 | | |
| WO | 2006/125508 A1 | 11/2006 | | |
| WO | 2008/114242 A1 | 9/2008 | | |
| WO | 2009/019677 A1 | 2/2009 | | |
| WO | 2014/181842 A1 | 11/2014 | | |
| WO | 2016/174663 A1 | 11/2016 | | |

* cited by examiner

MILLING TOOL

TECHNICAL FIELD

The present disclosure relates to a milling tool. The present application claims priority of Japanese Patent Application No. 2017-059267 filed on Mar. 24, 2017. The disclosure of the above-identified Japanese application is herein incorporated by reference in its entirety.

BACKGROUND ART

A milling tool disclosed in Japanese Patent Laying-Open No. 2016-159388 (PTL 1) has been known. The milling tool disclosed in PTL 1 includes a body, a cutting insert, a locking piece, and a bolt. The body has an outer circumferential surface and an insert pocket. The insert pocket is defined by a first side surface, a second side surface, and a bottom surface. The first side surface and the second side surface continue to the outer circumferential surface of the body. The first side surface and the second side surface are arranged to face each other in the circumferential direction of the body. The bottom surface continues to the first side surface and the second side surface.

The cutting insert is positioned in the insert pocket such that the cutting insert is in contact with the first side surface. The bolt is tightened to press the locking piece toward the bottom surface of the insert pocket. The locking pin has a side surface inclined toward the location where the cutting insert is positioned. The locking piece is fastened with the bolt to be pressed toward the bottom surface of the insert pocket, and accordingly the inclined side surface of the locking piece presses the cutting insert against the first side surface. Thus, the cutting insert is attached to the body.

In addition, milling tools disclosed for example in Japanese Patent Laying-Open No. 7-195220 (PTL 2) and Japanese National Patent Publication Nos. 2010-535638 (PTL 3) and 2007-525334 (PTL 4) have also been known.

CITATION LIST

Patent Literature

PTL 1: Japanese Patent Laying-Open No. 2016-159388
PTL 2: Japanese Patent Laying-Open No. 7-195220
PTL 3: Japanese National Patent Publication No. 2010-535638
PTL 4: Japanese National Patent Publication No. 2007-525334

SUMMARY OF INVENTION

A milling tool according to an aspect of the present disclosure includes: a body having an outer circumferential surface formed around a central axis; a cutting insert having a rake surface, a flank surface, and a cutting edge formed by a ridgeline of the rake surface and the flank surface; and a screw attaching the cutting insert to the body. The outer circumferential surface has an insert attachment portion which is recessed toward the central axis and to which the cutting insert is attached. The insert attachment portion is defined by a first seat surface and a second seat surface. The first seat surface continues to the outer circumferential surface. The second seat surface continues to the first seat surface. The second seat surface has a flat portion, and the flat portion has a screw hole in which the screw is inserted. The cutting edge is formed of a sintered material containing at least one of cubic boron nitride and polycrystalline diamond. In a cross section perpendicular to the central axis, a first angle formed by a first direction and a second direction is an acute angle, the first direction is a direction in which the screw hole extends, and the second direction is a direction perpendicular to the flat portion of the second seat surface and oriented inward of the body.

DETAILED DESCRIPTION

Figure 1:
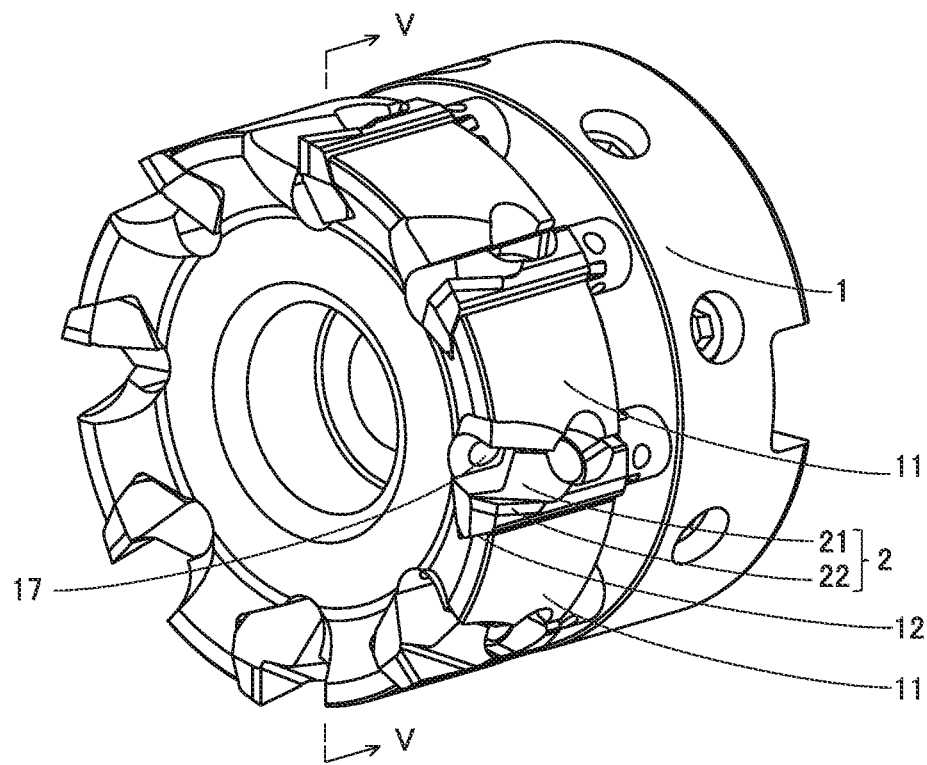
FIG. 1 is a perspective view of a milling tool according to an embodiment.

Problem to be Solved by the Present Disclosure

Regarding the milling tool disclosed in PTL 1, the clamping force applied for attaching the cutting insert to the body has room for improvement. If the clamping force is insufficient, the position at which the cutting insert is attached may be displaced during cutting, leading to deterioration of the cutting accuracy. If the clamping force is insufficient, the centrifugal force exerted on the cutting insert during cutting may cause the cutting insert to be detached to fly away from the body.

The present disclosure is given in view of the above-described problem with the conventional art. More specifically, the present disclosure provides a milling tool that enables improvement of the clamping force applied for attaching the cutting insert to the body.

Advantageous Effect of the Present Disclosure

A milling tool according to an aspect of the present disclosure enables improvement of the clamping force applied for attaching the cutting insert to the body.

Description of Embodiments of the Present Disclosure

First, characteristics of embodiments of the present disclosure are described one by one.

(1) A milling tool according to an aspect of the present disclosure includes: a body having an outer circumferential surface formed around a central axis; a cutting insert having a rake surface, a flank surface, and a cutting edge formed by a ridgeline of the rake surface and the flank surface; and a screw attaching the cutting insert to the body. The outer circumferential surface has an insert attachment portion which is recessed toward the central axis and to which the cutting insert is attached. The insert attachment portion is defined by a first seat surface and a second seat surface. The first seat surface continues to the outer circumferential surface. The second seat surface continues to the first seat surface. The second seat surface has a flat portion, and the flat portion has a screw hole in which the screw is inserted. The cutting edge is formed of a sintered material containing at least one of cubic boron nitride and polycrystalline diamond. In a cross section perpendicular to the central axis, a first angle formed by a first direction and a second direction is an acute angle, the first direction is a direction in which the screw hole extends, and the second direction is a direction perpendicular to the flat portion of the second seat surface and oriented inward of the body.

The milling tool of (1) described above enables improvement of the clamping force applied for attaching the cutting insert to the body.

(2) Regarding the milling tool of (1) described above, a second angle formed by the second direction and a third direction which is a direction from the cutting edge toward the central axis as seen in end view may be an acute angle.

The milling tool of (2) described above enables improvement of the machining accuracy.

(3) Regarding the milling tool of (2) described above, a sum of the first angle and the second angle may be more than or equal to 5° and less than or equal to 50°.

The milling tool of (3) described above enables suppression of interference between cutting inserts adjacent to each other when the cutting inserts are attached to the body.

(4) Regarding the milling tool of (1) to (3) described above, a third angle formed by the third direction and a fourth direction which is a direction parallel to a flat portion of the first seat surface and which is oriented inward of the body as seen in end view may be an acute angle.

The milling tool of (4) described above enables suppression of fly-away of the cutting insert from the body during cutting.

(5) Regarding the milling tool of (4) described above, the third angle may be more than 2° and less than or equal to 35°.

The milling tool of (5) described above enables suppression of stiffness degradation of the body.

(6) Regarding the milling tool of (1) to (5) described above, the insert attachment portion may be further defined by a fly-off prevention surface, the fly-off prevention surface faces the first seat surface with the cutting insert interposed between the fly-off prevention surface and the first seat surface, and a distance between the fly-off prevention surface and the first seat surface decreases gradually toward the outer circumferential surface.

The milling tool of (6) described above enables suppression of fly-away of the cutting insert from the body during cutting.

(7) Regarding the milling tool of (1) to (6) described above, a width of the second seat surface may be more than or equal to 0.8 times and less than or equal to 1 time as large as a width of the first seat surface as seen in end view.

The milling tool of (7) described above enables suppression of fly-away of the cutting insert from the body during cutting.

(8) Regarding the milling tool of (1) to (7) described above, the insert attachment portion may have an oil hole through which cutting oil to be supplied to the cutting edge flows. The cutting insert has an insert body, and the insert body may have an indentation extending upward from the rake surface.

The milling tool of (8) described above enables cooling of the cutting edge.

Details of the Embodiments of the Disclosure

Next, details of embodiments of the present disclosure are described with reference to the drawings. In the drawings, the same or corresponding parts are denoted by the same reference characters. Embodiments described below may at least partially be combined arbitrarily.

Structure of Milling Tool According to Embodiment

In the following, a structure of a milling tool according to an embodiment is described.

Figure 2:
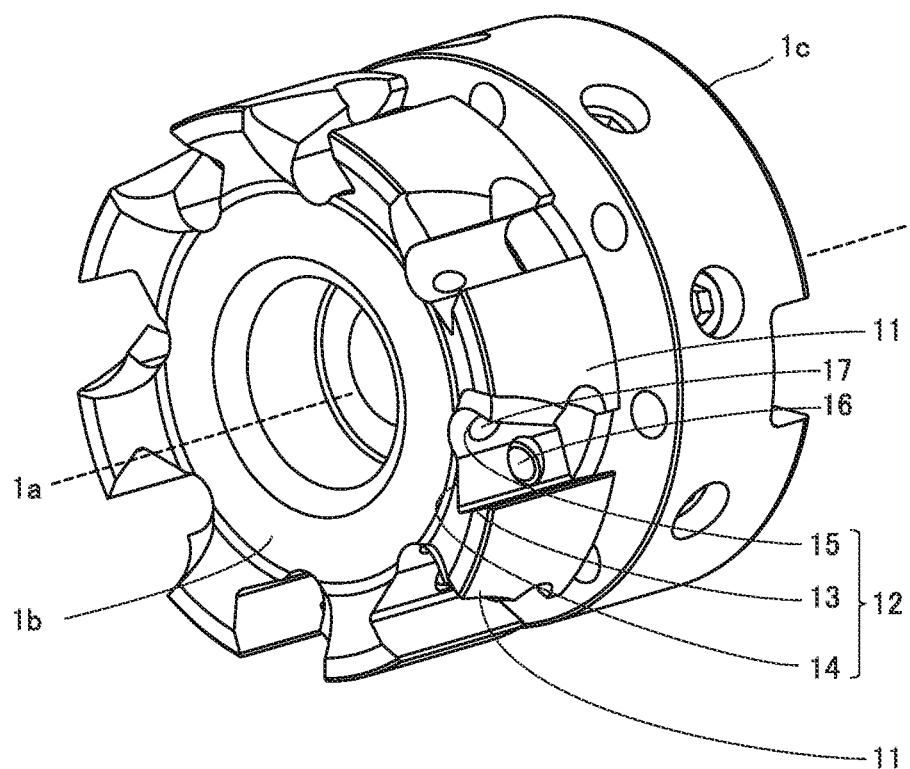
FIG. 2 is a perspective view of a body of the milling tool according to an embodiment.
Figure 3:
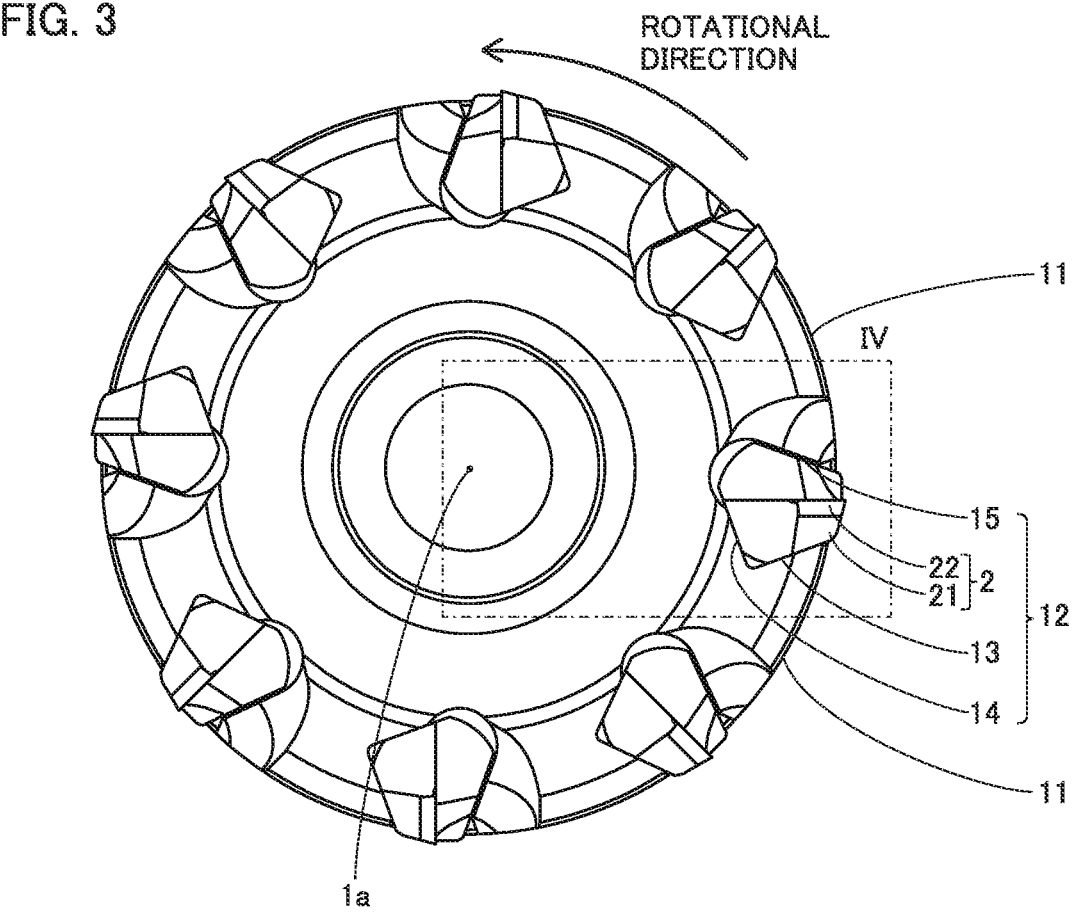
FIG. 3 is a front view of the milling tool according to an embodiment as seen from a first-end side.

FIG. 1 is a perspective view of a milling tool according to an embodiment. FIG. 2 is a perspective view of a body of the milling tool according to an embodiment. FIG. 3 is a front view of the milling tool according to an embodiment as seen from a first end 1b side. As shown in FIGS. 1 to 3, the milling tool according to an embodiment includes a body 1 and a cutting insert 2. Body 1 has a first end 1b and a second end 1c. First end 1b and second end 1c are ends of body 1 in the direction of a central axis 1a. Second end 1c is an end of body 1 to be attached to a headstock of a machine tool. First end 1b is an end opposite to second end 1c. Body 1 is made of steel for example.

Body 1 has an outer circumferential surface 11. Outer circumferential surface 11 is formed around central axis 1a of body 1. Outer circumferential surface 11 continues to first end 1b. Outer circumferential surface 11 has an arc shape as seen in end view. "End view" is a view of body 1 as seen from the first end 1b side in a direction parallel to central axis 1a. Outer circumferential surface 11 has an insert attachment portion 12. Outer circumferential surface 11 may have a plurality of insert attachment portions 12. Four or more insert attachment portions 12 may be arranged substantially at a diameter of one inch (2.54 cm) of an envelope circle of cutting edges centered at central axis 1a of body 1. Insert attachment portion 12 is recessed from outer circumferential surface 11 toward central axis 1a.

Figure 4:
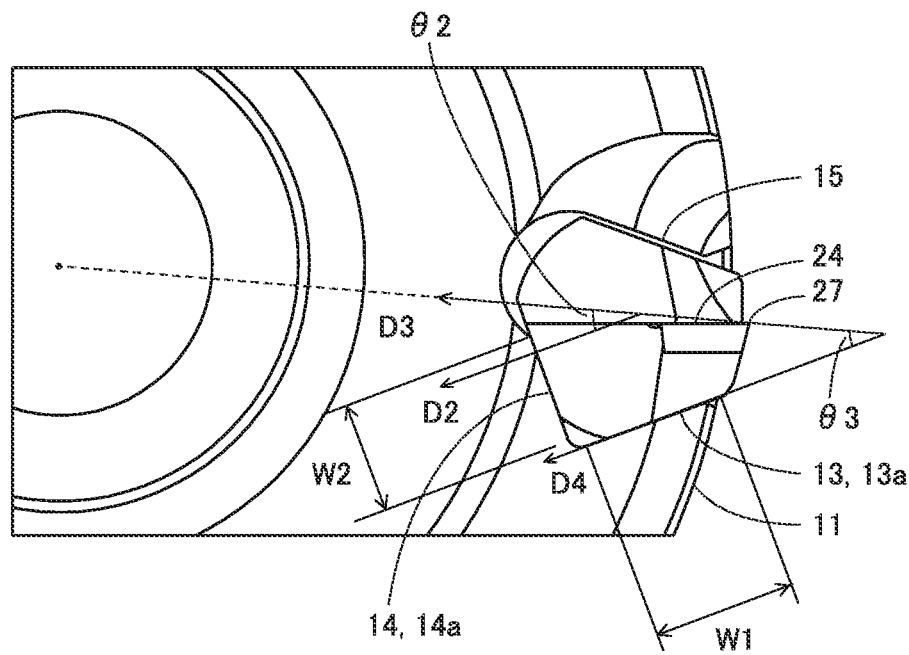
FIG. 4 is an enlarged view of a region IV in FIG. 3.

FIG. 4 is an enlarged view of a region IV in FIG. 3. As shown in FIG. 4, insert attachment portion 12 is defined by a first seat surface 13 and a second seat surface 14. Insert attachment portion 12 may further be defined by a fly-off prevention surface 15. First seat surface 13 is located rearward with respect to the rotational direction (indicated by an arrow in the drawing) of the milling tool according to an embodiment. The rotational direction of the milling tool according to an embodiment is the direction in which the milling tool according to the embodiment rotates such that a cutting edge 27 moves in the direction from the flank surface (side surface 26) side toward the rake surface 24 side. Fly-off prevention surface 15 is located forward with respect to the rotational direction of the milling tool according to an embodiment.

First seat surface 13 continues to outer circumferential surface 11. First seat surface 13 has a flat portion 13a. Flat portion 13a is formed by a flat surface. Second seat surface 14 continues to first seat surface 13. Second seat surface 14 has a flat portion 14a. Flat portion 14a is formed by a flat surface.

First seat surface 13 has a width W1 as seen in end view. Second seat surface 14 has a width W2 as seen in end view. Width W2 is preferably more than or equal to 0.8 times and less than or equal to 1 time as large as width W1.

Figure 5:
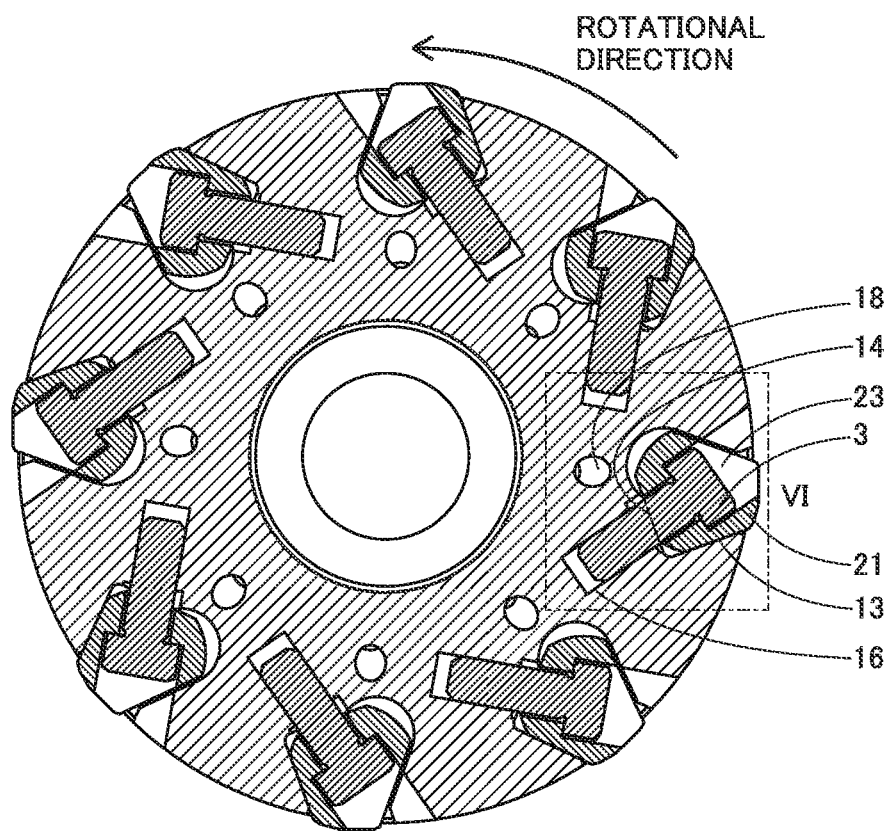
FIG. 5 is a cross-sectional view along V-V in FIG. 1.
Figure 6:
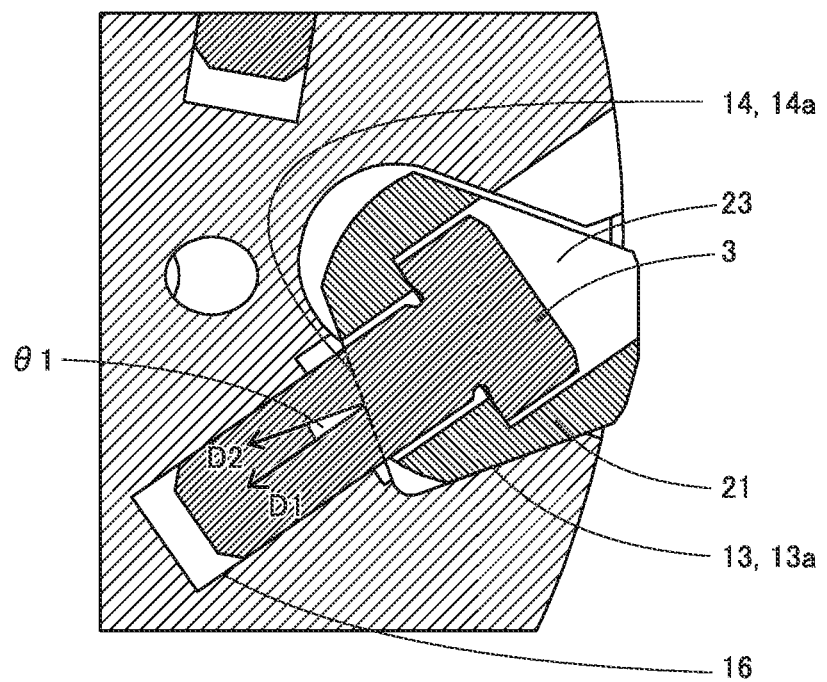
FIG. 6 is an enlarged view of a region VI in FIG. 5.

FIG. 5 is a cross-sectional view along V-V in FIG. 1. FIG. 6 is an enlarged view of a region VI in FIG. 5. As shown in FIGS. 5 and 6, second seat surface 14 has a screw hole 16. In screw hole 16, a screw 3 is inserted. A first direction D1 in which screw hole 16 extends and a second direction D2 which is perpendicular to flat portion 14a of second seat surface 14 and oriented inward of body 1 form a first angle θ1. First angle θ1 is an acute angle. The fact that first angle θ1 is an acute angle means that first direction D1 has been rotated from second direction D2 by an angle of more than 0° and less than 90° along the rotational direction of the milling tool according to an embodiment. First angle θ1 is preferably more than or equal to 5° and less than or equal to 45°. First angle θ1 within this range enables cutting insert 2 to be fixed firmly to body 1.

As shown in FIG. 4, second direction D2 and a third direction D3 which is the direction from cutting edge 27 toward central axis 1a form a second angle θ2. Second angle θ2 is preferably an acute angle. The fact that second angle θ2 is an acute angle means that second direction D2 has been rotated from third direction D3 by an angle of more than 0° and less than 90° along the rotational direction of the milling tool according to an embodiment. Second angle θ2 is preferably more than 0° and less than or equal to 35°. The sum of first angle θ1 and second angle θ2 is preferably more than or equal to 5° and less than or equal to 50°. The sum of first angle θ1 and second angle θ2 within this range enables increase of the region to which the cutting force is applied and enables cutting to be performed stably.

Third direction D3 and a fourth direction D4 which is parallel to flat portion 13a of first seat surface 13 and directed inward of body 1 form a third angle θ3. Third angle θ3 is preferably an acute angle. The fact that third angle θ3 is an acute angle means that fourth direction D4 has been rotated from third direction D3 by an angle of more than 0° and less than 90° along the rotational direction of the milling tool according to an embodiment. Third angle θ3 is preferably more than 2° and less than or equal to 35°. Preferably, third angle θ3 is substantially equal to second angle θ2. Specifically, third angle θ3 is preferably within a range of second angle θ2±5°. Accordingly, the process cost for forming insert attachment portion 12 can be reduced.

Fly-off prevention surface 15 is located to face first seat surface 13 with cutting insert 2 interposed between fly-off prevention surface 15 and first seat surface 13. Fly-off prevention surface 15 extends toward outer circumferential surface 11. The distance between fly-off prevention surface 15 and first seat surface 13 decreases gradually toward outer circumferential surface 11.

Insert attachment portion 12 may have an oil hole 17. Oil hole 17 is oriented toward cutting edge 27. Oil hole 17 communicates with a flow path 18 (see FIG. 5) provided in body 1. Cutting oil flowing though flow path 18 provided in body 1 is supplied to cutting edge 27 through oil hole 17.

Figure 7:
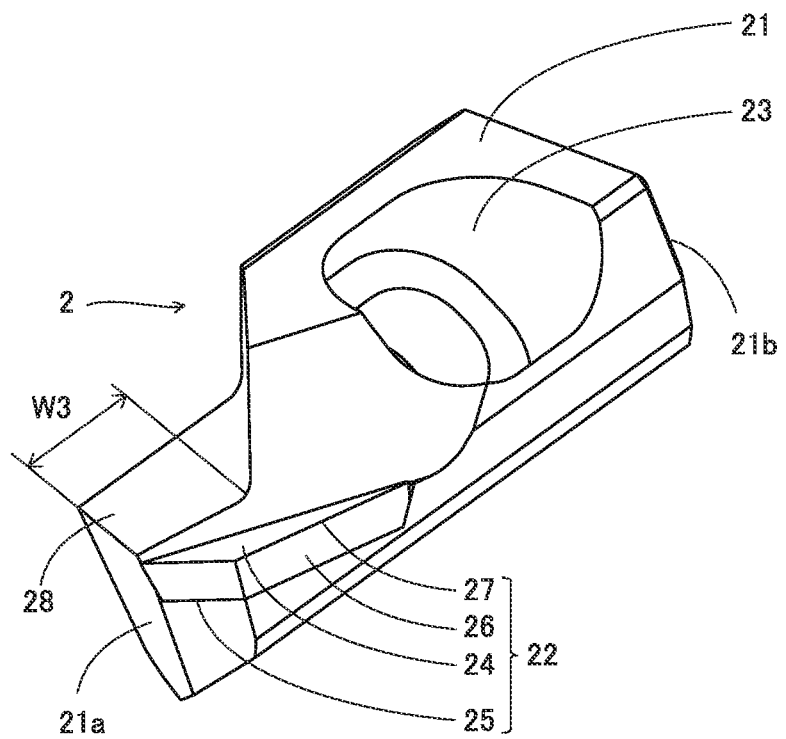
FIG. 7 is a perspective view of a cutting insert for a milling tool according to an embodiment.

As shown in FIGS. 1 and 3, cutting insert 2 is attached to insert attachment portion 12. FIG. 7 is a perspective view of the cutting insert for the milling tool according to an embodiment. As shown in FIG. 7, cutting insert 2 includes an insert body 21 and a cutting-edge insert 22.

Insert body 21 has a columnar shape. Insert body 21 is made of cemented carbide, for example. Cutting insert 2 is attached to insert attachment portion 12 such that the direction in which insert body 21 extends is along the direction from second end 1c toward first end 1b of the body. Cutting insert 2 is attached to insert attachment portion 12 such that insert body 21 is in contact with first seat surface 13 and second seat surface 14.

Insert body 21 has a through hole 23. Screw 3 inserted in through hole 23 is further inserted in screw hole 16 to thereby attach cutting insert 2 to insert attachment portion 12.

Cutting-edge insert 22 is attached by brazing or the like to insert body 21, for example. Cutting-edge insert 22 is formed of a sintered material containing at least one of cubic boron nitride (CBN) and polycrystalline diamond (PCD). Cutting-edge insert 22 has a flat plate shape.

Cutting-edge insert 22 has a rake surface 24, an attachment surface 25, a side surface 26, and a cutting edge 27. Attachment surface 25 is opposite to rake surface 24. Attachment surface 25 of cutting-edge insert 22 is brazed for example to insert body 21 and accordingly cutting-edge insert 22 is attached to insert body 21.

Cutting-edge insert 22 is attached to insert body 21 such that side surface 26 runs along the direction in which insert body 21 extends. Side surface 26 continues to rake surface 24. Cutting edge 27 is formed by a ridgeline of rake surface 24 and side surface 26. In other words, side surface 26 is a flank surface. Cutting edge 27 extends in the direction in which insert body 21 extends. In other words, cutting edge 27 extends in the direction from second end 1c toward first end 1b of body 1. Cutting insert 2 is attached to insert attachment portion 12 such that cutting edge 27 protrudes from outer circumferential surface 11.

Insert body 21 has a first end 21a (front end) and a second end 21b (rear end). First end 21a is an end of insert body 21 located on the first end 1b side of body 1 when cutting insert 2 is attached to insert attachment portion 12. Second end 21b is an end of insert body 21 located opposite to first end 21a.

Insert body 21 has an indentation 28. Indentation 21 is located at first end 21a of insert body 21. Indentation 28 is provided to extend upward from rake surface 24. In other words, a part of insert body 21 located higher than rake surface 24 has been removed. The direction "upward" is herein the direction from attachment surface 25 toward rake surface 24. In another point of view, indentation 28 is located forward of rake surface 24 with respect to the rotational direction as seen in end view. As seen in side view, indentation width W3 which is the distance from cutting edge 27 is preferably more than or equal to 0.1 time and less than or equal to 0.4 times as large as the length (distance between first end 21a and second end 21b) of insert body 21.

Advantageous Effects of Milling Tool According to Embodiment

In the following, advantageous effects of the milling tool according to an embodiment are described.

Figure 8:
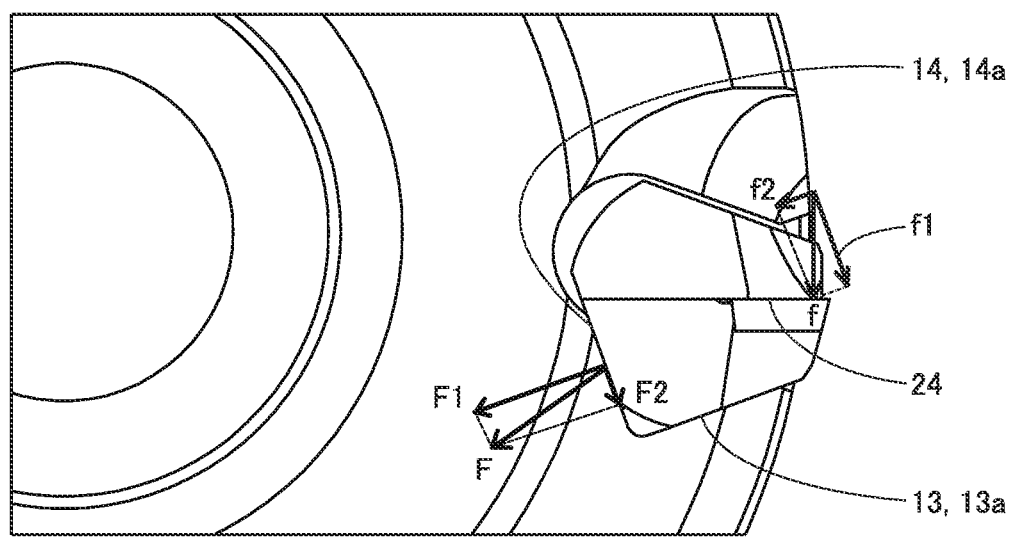
FIG. 8 is a schematic diagram illustrating advantageous effects of a milling tool according to an embodiment.

FIG. 8 is a schematic diagram illustrating advantageous effects of the milling tool according to an embodiment. As shown in FIG. 8, as screw 3 is inserted and tightened in screw hole 16, a clamping force F that clamps cutting insert 2 against insert attachment portion 12 is generated. Since first direction D1 is inclined such that first angle θ1 is an acute angle as described above, clamping force F consists of a component F1 perpendicular to flat portion 14a of second seat surface 14 and a component F2 perpendicular to flat portion 13a of first seat surface 13.

The milling tool according to an embodiment rotates about central axis 1a. This rotation causes a centrifugal force to be applied to cutting insert 2 in the direction of separating cutting insert 2 away from body 1. In the milling tool according to an embodiment, cutting insert 2 can be secured to body 1 by component F2 of clamping force F applied to cutting insert 2.

Thus, the milling tool according to an embodiment enables cutting insert 2 to be clamped more firmly against body 1. Accordingly, the milling tool according to an embodiment can suppress fly-away of cutting insert 2 caused by rotation during cutting. Further, the milling tool according to an embodiment can suppress deterioration of the machining accuracy due to positional displacement of cutting insert 2 caused by rotation during cutting.

In the case where second direction D2 is inclined with respect to third direction D3 such that second angle θ2 is an acute angle, a principal cutting force f applied from a workpiece to cutting insert 2 during cutting can be divided into a component f1 perpendicular to flat portion 13a of first seat surface 13 and a component f2 perpendicular to flat portion 14a of second seat surface 14. Therefore, in this case, both first seat surface 13 and second seat surface 14 can be subjected to principal cutting force f, and thus positional displacement of cutting insert 2 caused by the principal cutting force is less likely to occur and the machining accuracy can be improved.

If first angle θ1 and second angle θ2 are larger, a tool such as wrench used for tightening screw 3 may interfere with attached cutting insert 2 adjacent to screw 3. In the case where the sum of first angle θ1 and second angle θ2 is less than or equal to 50°, such interference can be suppressed.

In the case where fourth direction D4 is inclined with respect to third direction D3 such that third angle θ3 is an acute angle, fly-away of cutting insert 2 can be suppressed more effectively.

As third angle θ3 increases, the thickness of a portion of body 1 located between first seat surface 13 and outer circumferential surface 11 decreases. As a result of this, the stiffness of this portion may be decreased. In the case where third angle θ3 is less than or equal to 35°, such decrease of the stiffness can be suppressed.

In the case where insert attachment portion 12 is further defined by fly-off prevention surface 15, cutting insert 2 which may be caused to fly away during rotation is brought into contact with fly-off prevention surface 15, since fly-off prevention surface 15 faces first seat surface 13 such that the distance between fly-off prevention surface 15 and first seat surface 13 decreases gradually toward outer circumferential surface 11. Therefore, in this case, fly-away of cutting insert 2 can be suppressed more effectively.

In the case where width W2 of second seat surface 14 is more than or equal to 0.8 times and less than or equal to 1 time as large as width W1 of first seat surface 13, component F2 of clamping force F can be ensured more easily. Therefore, in this case, fly-away of cutting insert 2 can be suppressed still more effectively.

In the case where insert attachment portion 12 has oil hole 17, cutting edge 27 can be cooled by cutting oil during cutting. In the case where insert body 21 has indentation 28, supply of cutting oil from oil hole 17 to cutting edge 27 is less likely to be hindered by insert body 21. Therefore, in this case, cutting edge 27 can be cooled more efficiently.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1 body; 1a central axis; 1b first end; 1c second end; 11 outer circumferential surface; 12 insert attachment portion; 13 first seat surface; 13a flat portion; 14 second seat surface; 14a flat portion; 15 fly-off prevention surface; 16 screw hole; 17 oil hole; 18 flow path; 2 cutting insert; 21 insert body; 21a first end; 21b second end; 22 cutting-edge insert; 23 through hole; 24 rake surface; 25 attachment surface; 26 side surface; 27 cutting edge; 28 indentation; 3 screw; D1 first direction; D2 second direction; D3 third direction; D4 fourth direction; F clamping force; F1 clamping force component perpendicular to flat portion of second seat surface; F2 clamping force component perpendicular to flat portion of first seat surface; f principal cutting force; f1 principal-cutting-force component perpendicular to flat portion of first seat surface; f2 principal-cutting-force component perpendicular to flat portion of second seat surface; W1, W2, W3 width; θ1 first angle; θ2 second angle; θ3 third angle

The invention claimed is:

1. A milling tool comprising:
a body having an outer circumferential surface formed around a central axis;
a cutting insert having a rake surface, a flank surface continuing to the rake surface, and a cutting edge formed by a ridgeline of the rake surface and the flank surface; and
a screw attaching the cutting insert to the body,
the outer circumferential surface having an insert attachment portion which is recessed toward the central axis and to which the cutting insert is attached,
the insert attachment portion being defined by a first seat surface continuing to the outer circumferential surface and a second seat surface continuing to the first seat surface,
the second seat surface having a flat portion facing a rotational direction of the milling tool, the flat portion having a screw hole in which the screw is inserted,
the cutting edge being formed of a sintered material containing at least one of cubic boron nitride and polycrystalline diamond,
in a cross section perpendicular to the central axis, a first angle formed by a first direction and a second direction being an acute angle, the first direction being a direction in which the screw hole extends, the second direction being a direction perpendicular to the flat portion of the second seat surface and oriented inward of the body, wherein
the second direction is rotated from a third direction which is a direction from the cutting edge toward the central axis as seen in end view by an angle of more than 0° and less than 90° along the rotational direction of the milling tool.

2. The milling tool according to claim 1, wherein a sum of the first angle and the second angle is more than or equal to 5° and less than or equal to 50°.

3. The milling tool according to claim 1, wherein
the first seat surface has a flat portion, and
a third angle formed by the third direction and a fourth direction which is a direction parallel to the flat portion of the first seat surface and which is oriented inward of the body as seen in end view is an acute angle.

4. The milling tool according to claim 3, wherein the third angle is more than 2° and less than or equal to 35°.

5. The milling tool according to claim 1, wherein the insert attachment portion is further defined by a fly-off prevention surface, the fly-off prevention surface faces the first seat surface with the cutting insert interposed between the fly-off prevention surface and the first seat surface, and a distance between the fly-off prevention surface and the first seat surface decreases gradually toward the outer circumferential surface.

6. The milling tool according to claim 1, wherein a width of the second seat surface is more than or equal to 0.8 times and less than or equal to 1 time as large as a width of the first seat surface as seen in end view.

7. The milling tool according to claim 1, wherein
the insert attachment portion has an oil hole through which cutting oil to be supplied to the cutting edge flows,
the cutting insert has an insert body, and
a part of the insert body located forward of the rake surface with respect to the rotational direction of the milling tool is removed.

* * * * *